US012157648B2

(12) United States Patent
Kükenshöner

(10) Patent No.: US 12,157,648 B2
(45) Date of Patent: Dec. 3, 2024

(54) WINDING DEVICE FOR WINDING A MATERIAL WEB

(71) Applicant: Windmöller & Hölscher KG, Lengerich (DE)

(72) Inventor: Matthias Kükenshöner, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 301 days.

(21) Appl. No.: 17/761,388

(22) PCT Filed: Sep. 9, 2020

(86) PCT No.: PCT/EP2020/075142
§ 371 (c)(1),
(2) Date: Mar. 17, 2022

(87) PCT Pub. No.: WO2021/052826
PCT Pub. Date: Mar. 25, 2021

(65) Prior Publication Data

US 2022/0371845 A1 Nov. 24, 2022

(30) Foreign Application Priority Data

Sep. 18, 2019 (DE) ..................... 10 2019 125 179.6

(51) Int. Cl.
*B65H 45/28* (2006.01)
*B26D 1/06* (2006.01)
(Continued)

(52) U.S. Cl.
CPC ............. *B65H 18/10* (2013.01); *B26D 1/065* (2013.01); *B26D 5/06* (2013.01); *B65H 45/22* (2013.01);
(Continued)

(58) Field of Classification Search
CPC ........ B26D 1/065; B65H 45/22; B65H 45/28; B65H 2301/414432; B65H 2301/4148; B65H 2301/41487; B65H 2701/11234
See application file for complete search history.

(56) References Cited

U.S. PATENT DOCUMENTS 3,536,273 A 10/1970 Hawkins
8,221,298 B2 * 7/2012 Pirtle ..................... B65H 45/22 493/356
(Continued)

FOREIGN PATENT DOCUMENTS

EP 2952459 B1 3/2017

OTHER PUBLICATIONS

International Searching Authority—International Search Report, pertaining to International Application No. PCT/EP2020/075142, dated Dec. 14, 2020, together with the Written Opinion of the International Searching Authority and translation pages of ISR, 12 pages.

*Primary Examiner* — Sang K Kim
(74) *Attorney, Agent, or Firm* — Sunstein LLP

(57) ABSTRACT

The invention relates to a winding apparatus for winding a material web traveling in a direction of travel, having at least one blade for cutting the material web in a web direction into a plurality of partial material webs, and having a folding apparatus for folding the edges of the partial material webs. To furnish a winding apparatus that enables a material web with folded edges to be wound with as little wrinkling as possible, a folding element is furnished for each edge of the partial material webs. The at least one blade may be moved transversely to the direction of travel using a first oscillating apparatus. Using a second oscillating apparatus, the folding elements for the left-hand edges of the partial material webs, as viewed in the direction of travel, may be moved transversely to the direction of travel. Using a third oscillating (Continued)

apparatus, the folding elements for the right-hand edges of the partial material webs, as viewed in the direction of travel, may be moved transversely to the direction of travel. The first oscillating apparatus, second oscillating apparatus and third oscillating apparatus may be controlled by a control unit in such a manner that the folded edges of the partial material webs may be wound at an offset to one another.

8 Claims, 4 Drawing Sheets

(51) Int. Cl.

| | |
|---|---|
| ***B26D 5/06*** | (2006.01) |
| ***B65H 18/10*** | (2006.01) |
| ***B65H 45/22*** | (2006.01) |

(52) U.S. Cl.

CPC . *B65H 45/28* (2013.01); *B65H 2301/414322* (2013.01); *B65H 2301/41485* (2013.01); *B65H 2513/10* (2013.01); *B65H 2515/50* (2013.01); *B65H 2701/11234* (2013.01); *B65H 2701/1752* (2013.01); *B65H 2701/1944* (2013.01)

(56) References Cited

U.S. PATENT DOCUMENTS

| | | | | |
|---|---|---|---|---|
| 8,475,349 | B2 * | 7/2013 | Pirtle | B31F 7/006 493/356 |
| 8,777,829 | B2 * | 7/2014 | Pirtle | B31F 7/006 493/360 |
| 9,701,507 | B2 | 7/2017 | Rauscher | |
| 2014/0208905 | A1 * | 7/2014 | Galea | B26D 1/065 83/156 |
| 2015/0284207 | A1 * | 10/2015 | Galea | B26D 3/10 242/525 |
| 2016/0272455 | A1 * | 9/2016 | Schmitz | B65H 45/28 |
| 2018/0079613 | A1 * | 3/2018 | Galea | B65H 35/02 |

* cited by examiner

WINDING DEVICE FOR WINDING A MATERIAL WEB

CROSS-REFERENCE TO RELATED APPLICATIONS

This application is the national phase entry of International Patent Application No. PCT/EP2020/075142 filed on Sep. 9, 2020, and claims the benefit of German Patent Application No. 102019125179.6 filed Sep. 18, 2019, the disclosures of which are incorporated herein by reference in their entirety.

The invention relates to a winding apparatus for winding a material web traveling in a direction of travel, having at least one blade for cutting the material web in a web direction into a plurality of partial material webs, and having a folding apparatus for folding the edges of the partial material webs.

Stretch films are used for securing and packing individual articles, for example bags stacked on pallets. In this case, the articles are wrapped using stretch film so that the self-adhesive stretch film holds the articles together. The edges of stretch film, it has been found, are often the starting point for film tears that occur during winding and packing. Damage to the edges or boundary of a stretch film roll may render the roll unusable. Damage of this kind occurs, for example, if the finished roll of stretch film is improperly transported or falls to the ground.

It is known in the art that if the edges are folded or creased before they are wound onto a roll, the stretch film becomes more resistant to damage, and consequently fewer tears occur. However, folding the edges also leads to edge build-up when the film roll is wound straight along the edge, and this likewise renders the film roll unusable. When folding the edges, it is therefore necessary to wind the edges of the film on the roll offset to one another. This may be accomplished, for example, by oscillating the roll laterally.

U.S. Pat. No. 8,221,298 B2 discloses an apparatus for producing folded edges of a plastic film, in which a folding element is furnished behind each blade and each folding element generates two folded edges.

40 WO 2015/055726 A1 discloses a winding apparatus for winding a traveling material web, having at least one blade for cutting the material web into a plurality of partial material webs in a web direction and having a folding apparatus for folding the edges of the partial material webs. The winding apparatus comprises an oscillating apparatus by means of which the at least one blade may be moved transversely to the web direction.

EP 2 952 459 B1 discloses an apparatus and a method for producing a number of wound rolls of film, in which the edge region of the films is reinforced. The lateral end sections of two film sections arranged side by side, in this case, are folded by means of two adjacent folding elements.

In winding apparatuses that are known in the art, the folding units are arranged directly behind the blades and are mechanically coupled to them. For folding the edges, folding units are used that fold both of the opposite edges of adjacent film webs. It has been observed that in this case wrinkles may form on the film, which in turn may impair the film's function.

Accordingly, the object of this invention is to provide a winding apparatus that enables a material web with folded edges to be wound with as little wrinkling as possible.

This object is accomplished by means of a winding apparatus according to claim 1. Preferred embodiments are set forth in the dependent claims.

According to the invention, a folding element is furnished for each edge of the partial material webs. The at least one blade may be moved transversely to the direction of travel using a first oscillating apparatus. The folding elements for the left-hand edges of the partial material webs, as viewed in the direction of travel, may be moved transversely to the direction of travel using a second oscillating apparatus. Using a third oscillating apparatus, the folding elements for the right-hand edges of the partial material webs, as viewed in the direction of travel, may be moved transversely to the direction of travel. The first oscillating apparatus, second oscillating apparatus and third oscillating apparatus may be controlled by a control unit in such a manner that the folded edges of the partial material webs may be wound at an offset.

With the winding apparatus according to the invention, unlike the winding apparatuses that are known in the art, the width of the folded edges may be adjusted. If the machine parameters change, the width of the folded edges may be held constant by the control unit. In this way, the same number of layers of film may always be wound during a cycle of the oscillating blades, which effectively reduces wrinkle formation on the film.

According to one preferred embodiment, the first oscillating apparatus, second oscillating apparatus and third oscillating apparatus each respectively consist of a motor-driven eccentric.

According to another preferred embodiment, the frequencies of the first oscillating apparatus, second oscillating apparatus and third oscillating apparatus are separately adjustable by means of the control unit.

According to another preferred embodiment, the strokes of the first oscillating apparatus, second oscillating apparatus and third oscillating apparatus are separately adjustable by means of the control unit.

According to another preferred embodiment, the thickness profile of the wound roll is measured and transmitted to the control unit.

According to another preferred embodiment, the web speed of the material web is measured and transmitted to the control unit.

According to another preferred embodiment, the material web is a stretch film produced on a cast film line or on a blown film line.

Additional details and advantages of the invention are described with reference to the attached drawings.

FIG. 1 shows an exemplary cutter bar according to a first embodiment of the invention. The material web 101 is a stretch film produced on a cast film line.

Figure 1:
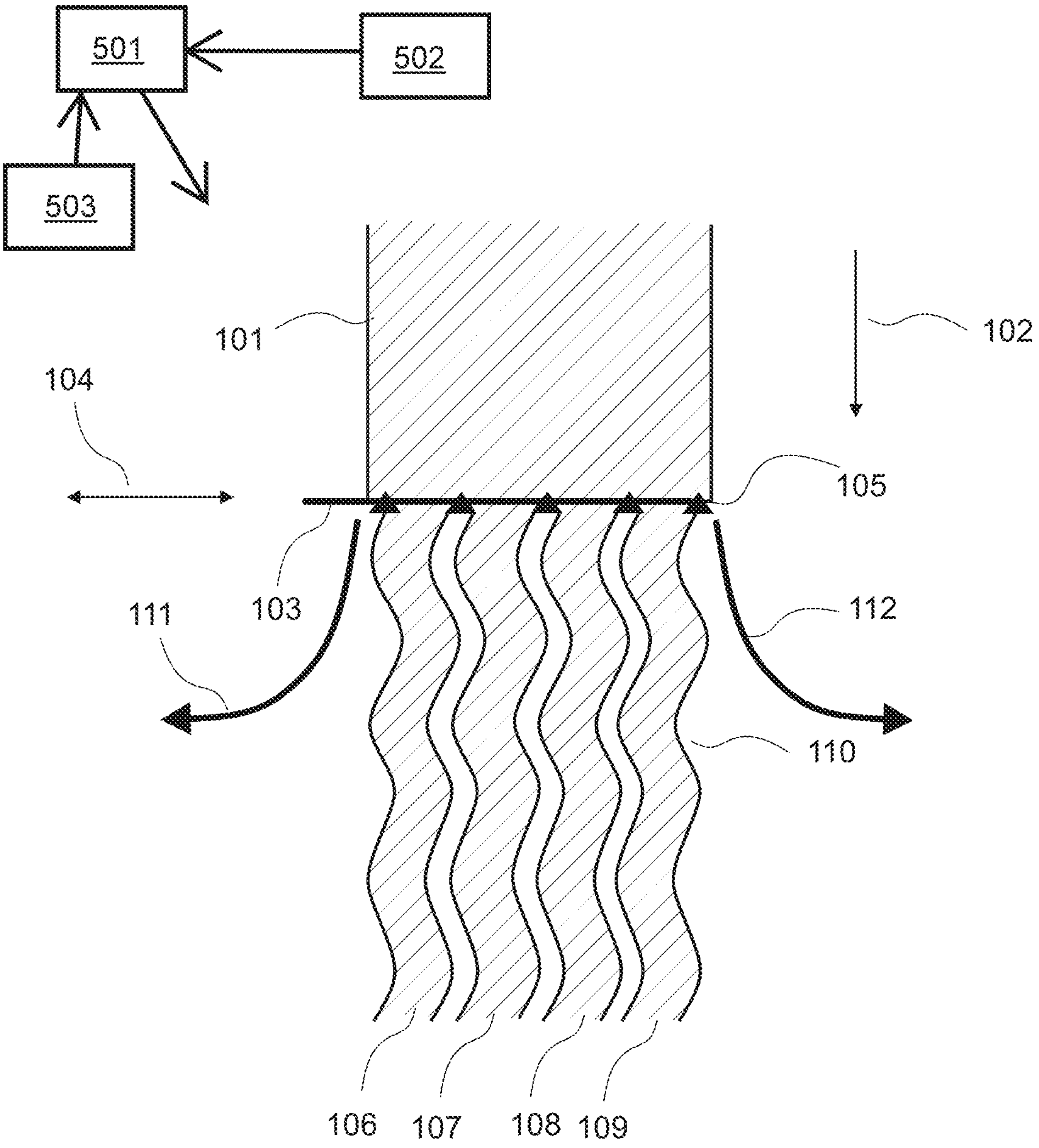
FIG. 1 shows an exemplary cutter bar according to a first embodiment of the invention.

After being produced, the stretch film 101 is transported in the direction 102 to reach the cutter bar 103. The cutter bar 103 is moved back and forth in the direction 104 by an oscillating apparatus, and has a total of five cutting blades 105. To the left and the right of the edges there is a respective scrap cut 111 and 112, which may be further processed for other purposes.

Behind the cutter bar 103, there are S-shaped strips 106, 107, 108 and 109, having approximately the shape shown in FIG. 1. The S-shaped edge in this case does not have to be uniform at all. The amplitude and frequency of the movement of the oscillating apparatus may likewise be irregular. In addition, it is also conceivable that the individual blades 105 are controlled individually and thus perform different movements.

Figure 2:
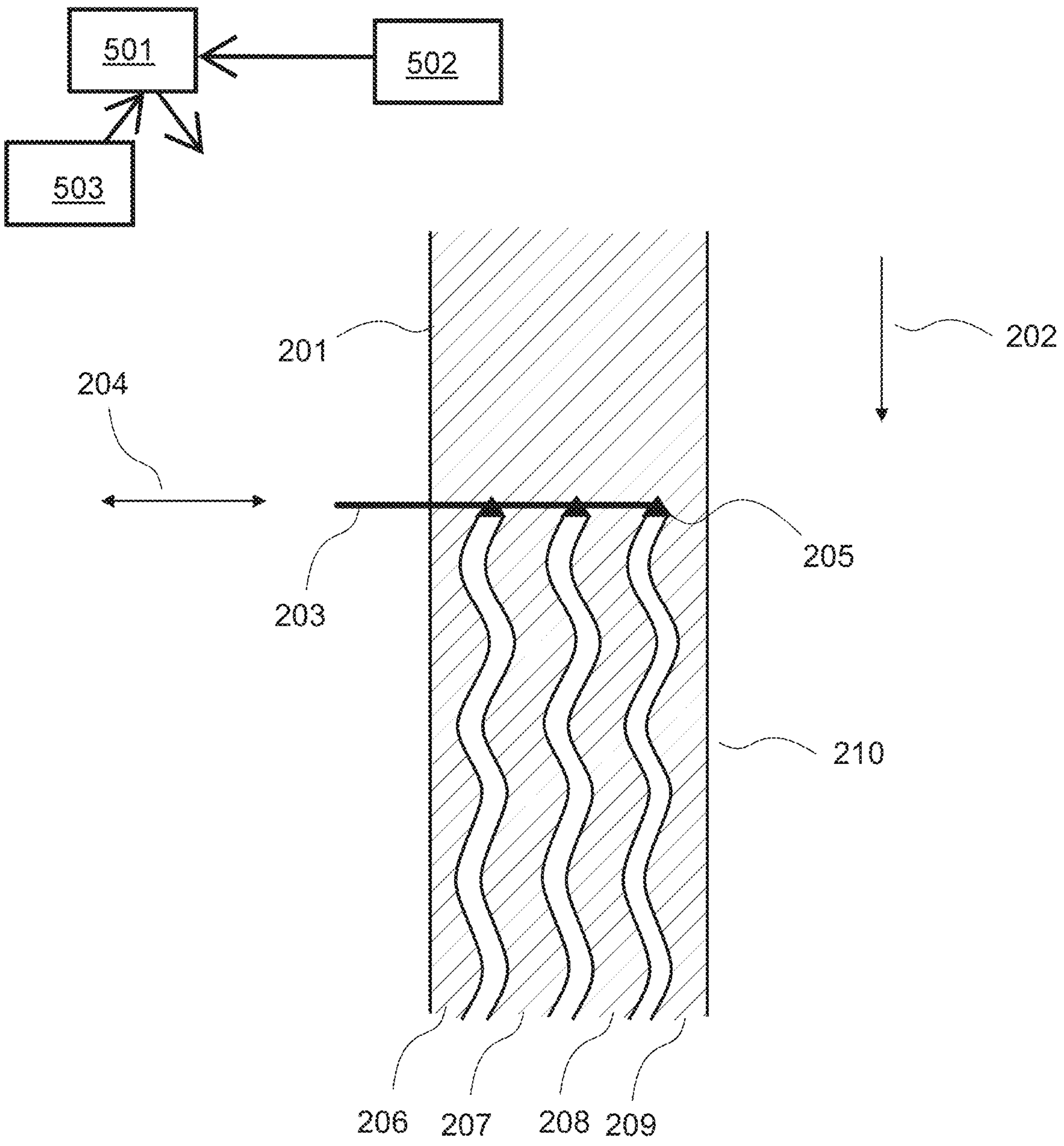
FIG. 2 shows an exemplary cutter bar according to a second embodiment of the invention.

FIG. 2 shows an exemplary cutter bar according to a second embodiment of the invention. Here again, the material web 201 is a stretch film produced on a cast film line.

After being produced, the stretch film 201 is transported in the direction 202 to reach the cutter bar 203. The cutter bar 203 is moved back and forth in the direction 204 by an oscillating apparatus, and has a total of three cutting blades 205. Because the outermost edges on the left and right sides are left untrimmed, there is no scrap, unlike the embodiment shown in FIG. 1.

Behind the cutter bar 203, there are S-shaped strips 206, 207, 208 and 209, having roughly the shape shown in FIG. 2. The S-shaped edge in this case does not have to be uniform at all. The amplitude and frequency of the movement of the oscillating apparatus may likewise be irregular. In addition, it is also conceivable that the individual blades 205 are individually controlled and thus carry out different movements.

The outer strips 206 and 209 each respectively have a straight edge and an S-shaped edge, and are further processed in this shape for specific purposes.

Figure 3:
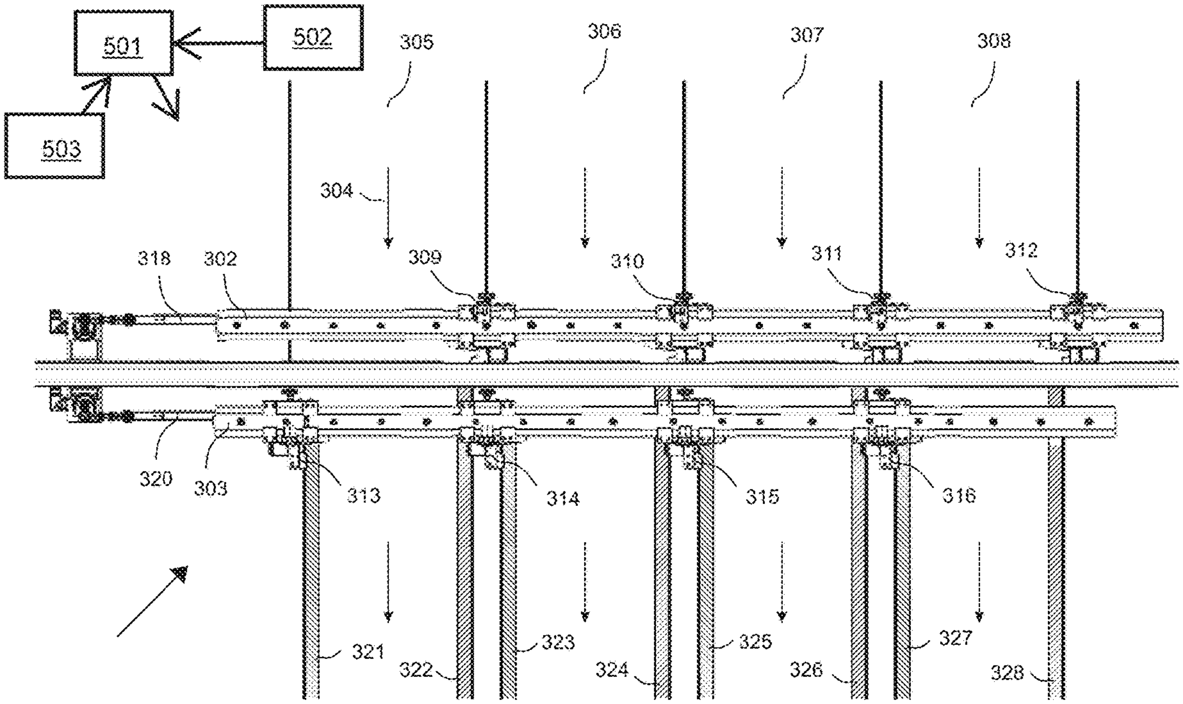
FIG. 3 shows a top view of a folding apparatus according to the invention.

FIG. 3 shows a top view of a folding apparatus according to the invention. Viewed in the direction of travel, the folding apparatus is located behind a cutter bar, for example such a cutter bar as shown in FIG. 1 or FIG. 2. The folding apparatus consists of a cross beam 301, to which are fastened a first guide rail 302 and a second guide rail 303. Four partial material webs 305, 306, 307 and 308, which were previously cut from a material web over the entire width at the cutter bar 103 or 203, traveling in a direction of travel 304.

The folding apparatus is configured in such a way that a folding element is furnished for each edge of the partial material webs 305, 306, 307 and 308. The folding elements 309, 310, 311 and 312 are slidably guided on the first guide rail 302 and thus fold over the left-hand edges, as viewed in the direction of travel 304, of the partial material webs 305, 306, 307 and 308. Correspondingly, the folding elements 313, 314, 315 and 316 are guided slidably on the second guide rail 303 and thus fold over the right edges of the partial material webs 305, 306, 307 and 308, as viewed in the direction of travel 304.

The folding elements 309, 310, 311 and 312 are connected to the gear rod 318, which is driven by an eccentric motor 317. Correspondingly, the folding elements 313, 314, 315 and 316 are connected to the gear rod 320, which is driven by an eccentric motor 319.

A first oscillating apparatus has already been described with reference to the cutter bar 103 shown in FIG. 1, and with reference to the cutter bar 203 shown in FIG. 2. The eccentric motor 317 also features a second oscillating apparatus, by means of which the folding elements 309, 310, 311 and 312 for the left-hand edges of the partial material webs, as viewed in a direction of travel 304, may be moved transversely to the direction of travel 304. Correspondingly, the eccentric motor 319 features a third oscillating apparatus with which the folding elements 313, 314, 315 and 316 for the right edges of the partial material webs, as viewed in a direction of travel 304, may be moved transversely to the direction of travel 304.

In the following, the functionality of the second oscillating apparatus is described. The same also applies analogously to the third oscillating apparatus.

A rotary motion of the eccentric motor 317 is converted into a linear movement of the folding elements 309, 310, 311 and 312, transverse to the direction of travel 304. The eccentric motor 317 does not rotate continuously, but instead carries out an alternating partial rotation within a predetermined angular segment. The stroke of the folding elements 309, 310, 311 and 312 may thus be adjusted by means of the opening angle of the angular segment. Moreover, the frequency of the alternating partial rotation corresponds to the frequency of movement of the folding elements 309, 310, 311 and 312. If the stroke movements of the folding elements 309, 310, 311 and 312, as well as the folding elements 313, 314, 315 and 316, are offset to one another, the width of the folded edge may be set in this way.

The frequency and stroke of the three oscillating units are adjusted to one another by a control unit in such a way that the folded edges of the partial material webs may be wound at an offset, so that the above-mentioned edge build-up is avoided.

Figure 4:
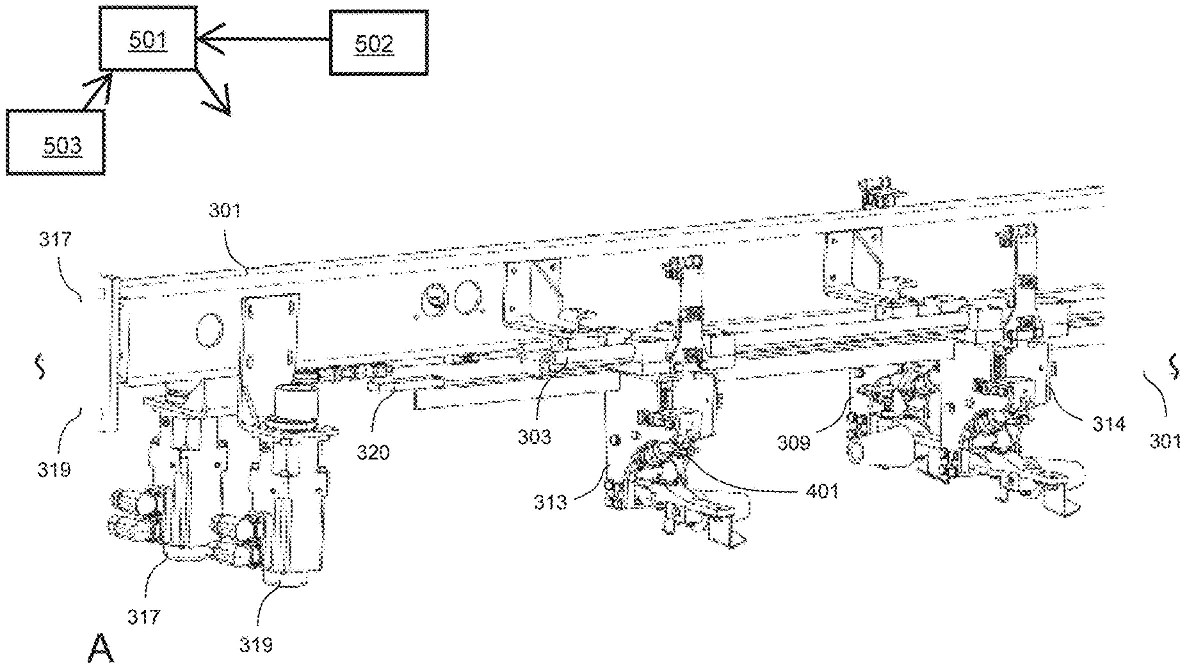
FIG. 4 shows a perspective representation of the view A shown in FIG. 3.

FIG. 4 shows a perspective representation of view A shown in FIG. 3. Identical parts are assigned identical reference numerals; thus, in that respect, reference is made to the description shown in FIG. 3. In addition, in the representation shown in FIG. 4, each folding element has a controllable lifting cylinder; for the sake of clarity, in FIG. 4 only the lifting cylinder of the folding element 313 is marked with reference sign 401. By means of the lifting cylinder, the folding elements may respectively be swiveled inward or outward relative to the web path. In this way, the setup time for a new job, for example, may be reduced by allowing the operator to control the simultaneous swiveling-in of a plurality of folding elements with one corresponding machine command. In addition, consequent damage in the event of malfunction may be avoided by automatically swinging the folding elements out of the web path upon a malfunction being detected.

The invention claimed is:

1. A winding apparatus for winding a material web that travels in a direction of travel, comprising:

- at least one blade for cutting the material web in the direction of travel into a plurality of partial material webs;
- a plurality of folding elements for folding the edges of the partial material webs, wherein one folding element is furnished for each edge of the partial material webs,
- a first oscillating apparatus configured to move the at least one blade transversely to the direction of travel;
- a second oscillating apparatus configured to move the folding elements for the left-hand edges of the partial material webs transversely to the direction of travel;
- a third oscillating apparatus configured to move the folding elements for the right-hand edges of the partial material webs transversely to the direction of travel; and
- a control unit coupled to, and configured to control, the first oscillating apparatus, the second oscillating apparatus and the third oscillating apparatus, in such a way that the folded edges of the partial material webs are wound at an offset.

2. The winding apparatus according to claim 1, wherein the first oscillating apparatus, the second oscillating apparatus and the third oscillating apparatus each respectively consist of a motor-driven eccentric.

3. The w-Winding apparatus according to claim 1, wherein the control unit is further configured to cause adjustment of widths of the folded edges.

4. The winding apparatus according to claim 1, wherein the control unit is further configured to cause individual adjustment of the frequencies of the first oscillating apparatus, the second oscillating apparatus and the third oscillating apparatus.

5. The winding apparatus according to claim 1, wherein the control unit is further configured to cause individual adjustment of the strokes of the first oscillating apparatus, the second oscillating apparatus and the third oscillating apparatus.

6. The winding apparatus according to claim 1, wherein the control unit is configured to receive a measurement of a thickness profile of the wound roll.

7. The winding apparatus according to claim 1, wherein the control unit is configured to receive a measurement of a web speed of the material web.

8. The winding apparatus according to claim 1, wherein the material web is a stretch film produced on a cast film line or on a blown film line.

* * * * *